March 2, 1948.
C. K. GABRIEL
2,436,961
RETRACTABLE VEHICLE STEP
Filed May 24, 1944
2 Sheets-Sheet 1
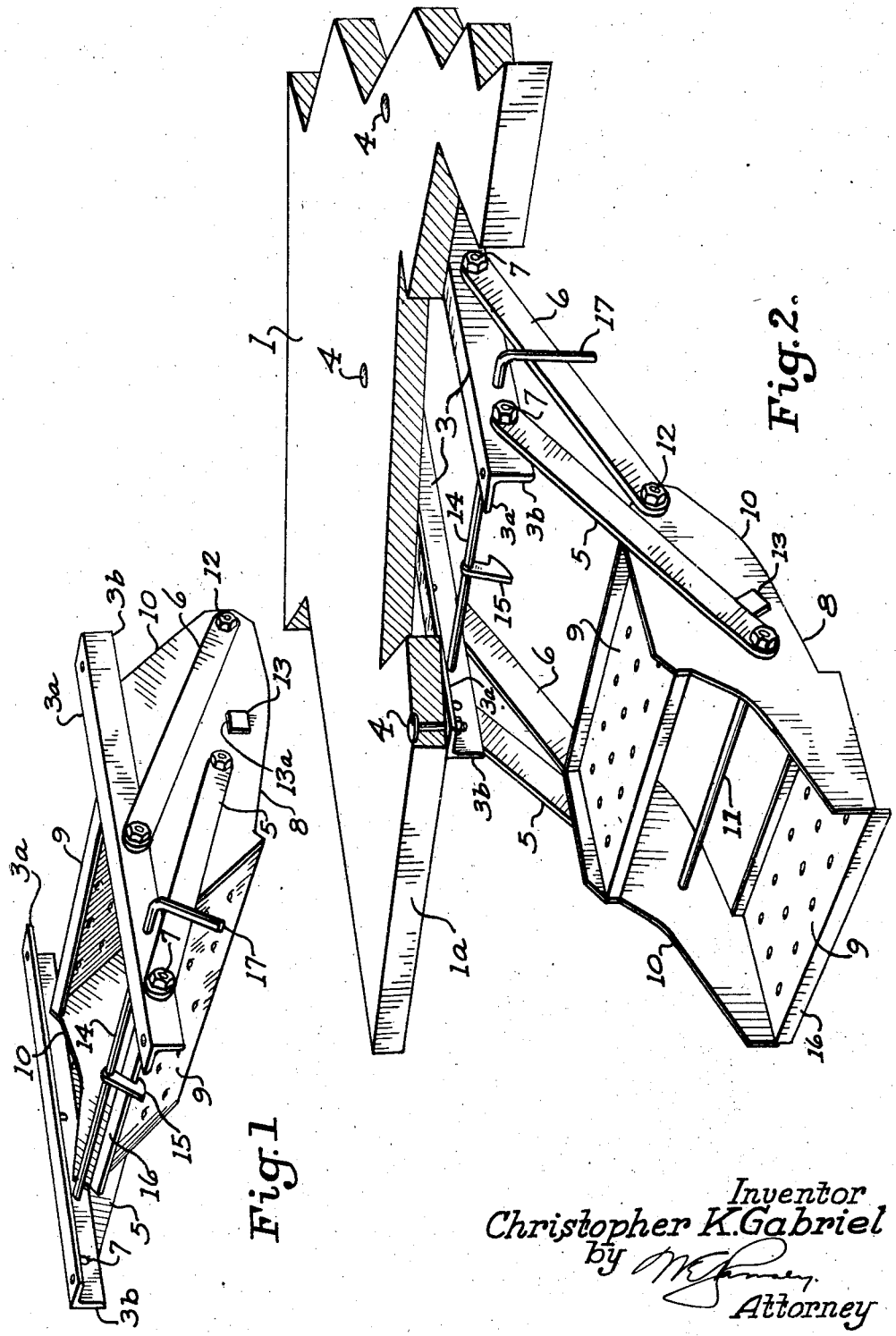
Inventor
Christopher K. Gabriel
by *M. Ramsey*,
Attorney March 2, 1948.    C. K. GABRIEL    2,436,961
RETRACTABLE VEHICLE STEP
Filed May 24, 1944    2 Sheets-Sheet 2

Inventor
Christopher K. Gabriel
by
Attorney

Patented Mar. 2, 1948

2,436,961

UNITED STATES PATENT OFFICE 2,436,961

RETRACTABLE VEHICLE STEP

Christopher K. Gabriel, Portland, Oreg.

Application May 24, 1944, Serial No. 537,115

4 Claims. (Cl. 280—166)

My invention relates to retractable steps for automobile trucks and other vehicles, which are adapted to swing out beyond and below a marginal edge of the frame or bed of such vehicle and to be braced automatically in such extended position. Said retractable steps are adapted also to swing on their supports closely under and within the marginal portions of said frame, so as to be out of the way.

The principal object of my invention is to provide steps of this character made of few and simple parts, disposed efficiently to sustain stresses and to produce a rigid structure when extended and a compact assembly when retracted.

A further and more specific object of my invention is to provide a step structure of this character which is adapted automatically to become latched when it swings back to retracted position, and the latching mechanism is adapted easily and quickly to be released when it is desired to cause said step to be swung to extended position. Said latching mechanism is adapted securely to hold the steps in retracting position, and the parts are proportioned and arranged so as not to become distorted nor to bind in use.

Further and other details of my invention, and the mode of operation thereof, are hereinafter described, with reference to the accompanying drawings, in which:

Fig. 1 is a perspective view of said step structure, together with the rails for applying it to a vehicle, the step being shown in retracted position;

Fig. 2 is a perspective view of said step structure shown in place, supported by the underface of the floor, with the parts arranged in extended position;

Figure 3:
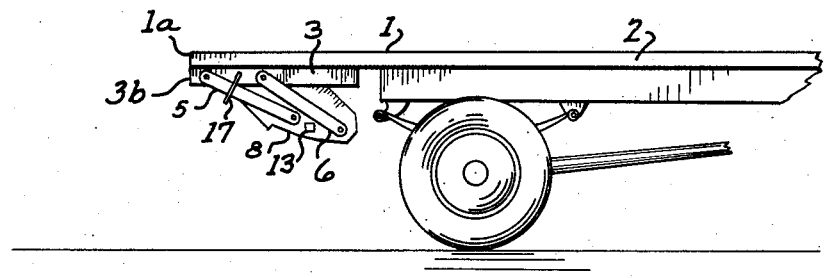
Fig. 3 is a side elevation of said step structure in retracted position attached to the undersurface of the body of a truck or other wheeled vehicle.

A retractable step structure embodying my invention is adapted to be secured to the undersurface of the floor or bed 1 of a vehicle 2, such, for example, as an automobile truck, because it is with such type of vehicle that my invention has its greatest use. Said step structure comprises a pair of spaced rails 3. which are shown in the form of angle irons, with one flange 3a arranged inwardly and bolted to the undersurface of the floor by means of bolts 4. The other flange 3b is arranged vertically.

Pairs of arms 5 and 6 are pendently supported to each of said rails by bolts 7, or other fastening devices. The arm 5 of each pair is secured to a rail adjacent one end thereof, and arm 6 is connected to said rail inwardly thereof and adjacent the middle of said rail. Said arms are elongated and preferably are made of flat, straight bars of steel. The lower end of arm 5 is secured to a bucket step 8 near the middle thereof, and the lower end of arm 6 is secured to said bucket step 8 adjacent the rear end. Said bucket step comprises treads 9, joined by side members 10. Said side members and treads preferably are welded together to form an integral structure. The lower ends of arms 5 preferably are joined to the step by means of a through bolt 11, which extends transversely of the bucket step and through the side members thereof. The lower ends of arms 6 are secured to said side members by bolts 12. Said arms are proportioned and arranged to hold the bucket step beyond the marginal edge 1a of the floor or bed and to hold the treads 9 substantially horizontal—that is, parallel—with the plane of said floor or bed.

A laterally projecting stop 13 is secured to one or both exterior faces of side members 10 and engages arm or arms 5, respectively, near the lower end or ends thereof, as is shown in Fig. 2. When the arm 5 engages the upper face 13a of stop 13, the elongated arm 6 is arranged so that its major dimension, if projected, would extend adjacent said face and through the pivot axis of the through bolt 11. This places the arm 6 in compression without producing flexure. Thus, it is best disposed to prevent said step from swinging inwardly under weight placed upon either of the treads 9. When it is desired to have the step swing to retracted position, it is necessary only to lift the lowermost tread upwardly to cause the arm 6 to pivot about its pivot bolt 12, and the step will then move by its own weight, inwardly.

Extending across the rails is a pivoted latch rod 14, having a pawl or latch 15 fixed thereto. The forward edge of the lowermost tread has a laterally disposed flange 16 formed thereon, and when the step structure is swung to retracted position, said pawl or latch engages said flange to hold the step structure in retracted position, as is shown in Figs. 1 and 3.

Figure 4:
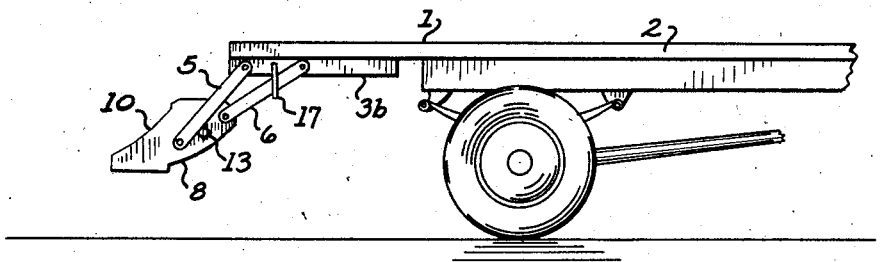
Fig. 4 is a similar view showing the parts arranged in extended position.

The end of said latch rod is bent at an angle to form a crank 17, lying exteriorly of one rail. Thus, when it is desired to release said latch to permit the step to move into extended position, this may be tripped by rotating the crank clockwise, as viewed in Figs. 3 and 4. This permits the step to swing towards extended position and, usually, with sufficient force to cause the parts to move to the position shown in Figs. 2 and 4, and to be locked in extended position. Likewise, it is possible to lift the lowermost tread by the flange 16 and push the step under the bed with a shove, so that it swings to the position shown in Figs. 1 and 3 and becomes latched automatically. Thus, said retractable step structure may easily be swung from one position to another with a push, and will become locked at the position toward which it is swung.

I claim:

1. A retractable step structure for a vehicle comprising a pair of rails adapted to be secured in spaced relation to an undersurface of said vehicle, pairs of spaced, elongated arms pendently supported from each of said rails, an integral bucket-like step pivotally secured between said pairs of arms and adapted to be swung from an extended position beyond the ends of said rails to a retracted position closely beneath the latter, a stop member projecting laterally from one of said sides and positioned to be engaged on one face by one of said arms when said step is swung to extended position, the other arm of said pair, not engaged by said stop, being straight and extending substantially in a line passing through the engaging face of said stop and the pivot connection of said engaging arm with said step, when the step is in extended position, to brace and hold said step against retraction.

2. A retractable step structure for a vehicle comprising a pair of rails adapted to be secured in spaced relation to an undersurface of said vehicle, pairs of spaced, elongated arms pendently supported from each of said rails, an integral bucket-like step pivotally secured between said pairs of arms and adapted to be swung from an extended position beyond the ends of said rails to a retracted position closely beneath the latter, said step having a tread with a laterally disposed flange formed thereon and a pendent latching member extending intermediate said rails, said latch and flange being disposed automatically to come into operative engagement when said step is retracted.

3. A retractable step structure for a vehicle comprising a pair of rails adapted to be secured in spaced relation to an undersurface of said vehicle, pairs of spaced, elongated arms pendently supported from each of said rails, an integral bucket-like step pivotally secured between said pairs of arms and adapted to be swung from an extended position beyond the ends of said rails to a retracted position closely beneath the latter, said step having a tread with a laterally disposed flange formed thereon and a pendent latching member extending intermediate said rails, said latch and flange being disposed automatically to come into operative engagement when said step is retracted, and a latch releasing crank lying exteriorly of one of said rails and adapted to actuate said latch to disengage it.

4. A retractable step structure for a vehicle comprising a pair of rails adapted to be secured in spaced relation to an undersurface of said vehicle, pairs of spaced, elongated arms pendently supported from each of said rails, an integral bucket-like step pivotally secured between said pairs of arms and adapted to be swung from an extended position beyond the ends of said rails to a retracted position closely beneath the latter, said step having plane sides bearing closely within said arms and a stop member projecting laterally from one of said sides and positioned to be engaged on one face by one of said arms when said step is swung to extended position, the other arm of said pair, not engaged by said stop, being straight and extending substantially in a line passing through the engaging face of said stop and the pivot connection of said engaging arm with said step, when the step is in extended position, to brace and hold said step against retraction, said step having a tread with a laterally disposed flange formed thereon and a pendent latching member extending intermediate said rails, said parts being disposed automatically to come into operative engagement when said step is retracted, and a latch releasing crank lying exteriorly of one of said rails and adapted to actuate said latch to disengage it.

CHRISTOPHER K. GABRIEL.

REFERENCES CITED

The following references are of record in the file of this patent:

UNITED STATES PATENTS

| Number | Name | Date |
|---|---|---|
| 2,246,986 | Pellegrini | June 24, 1941 |
| 115,665 | Wells | June 6, 1871 |
| 606,932 | Maxon | July 5, 1898 |
| 1,184,383 | Roebuck | May 23, 1916 |
| 2,246,985 | Pellegrini | June 24, 1941 |